US012793961B2

(12) United States Patent
Caldwell et al.

(10) Patent No.: US 12,793,961 B2
(45) Date of Patent: Nov. 10, 2026

(54) SINTERED CATHODE ACTIVE MATERIAL BRICKS AND METHODS THEREOF

(71) Applicant: TESLA, INC., Austin, TX (US)

(72) Inventors: Turner Boris Caldwell, San Francisco, CA (US); Anthony Michael Thurston, Morgan Hill, CA (US); Hao Liu, Mountain View, CA (US); Alexander Thomas Miller, Fremont, CA (US)

(73) Assignee: Tesla, Inc., Austin, TX (US)

( * ) Notice: Subject to any disclaimer, the term of this patent is extended or adjusted under 35 U.S.C. 154(b) by 639 days.

(21) Appl. No.: 18/245,848

(22) PCT Filed: Sep. 20, 2021

(86) PCT No.: PCT/US2021/051128
§ 371 (c)(1),
(2) Date: Mar. 17, 2023

(87) PCT Pub. No.: WO2022/066584
PCT Pub. Date: Mar. 31, 2022

(65) Prior Publication Data

US 2023/0343923 A1 Oct. 26, 2023

Related U.S. Application Data

(60) Provisional application No. 63/081,470, filed on Sep. 22, 2020.

(51) Int. Cl.
*H01M 4/04* (2006.01)
*C01G 53/504* (2025.01)
(Continued)

(52) U.S. Cl.
CPC ........ *H01M 4/0471* (2013.01); *C01G 53/504* (2025.01); *C01G 53/506* (2025.01); *H01M 4/622* (2013.01); *H01M 2004/028* (2013.01)

(58) Field of Classification Search
None
See application file for complete search history.

(56) References Cited

U.S. PATENT DOCUMENTS 8,241,521 B2 8/2012 Jin et al.
2017/0282134 A1* 10/2017 He .......................... B01F 27/95

FOREIGN PATENT DOCUMENTS

CN 1947281 * 4/2007
CN 107709624 * 2/2018
(Continued)

OTHER PUBLICATIONS

International Search Report and Written Opinion dated Dec. 21, 2021 in application No. PCT/US2021/051128.

*Primary Examiner* — Sheng H Davis
(74) *Attorney, Agent, or Firm* — Knobbe, Martens, Olson & Bear, LLP

(57) ABSTRACT

Disclosed are self-standing calcined elements (e.g. bricks and tiles) comprising a cathode active material, and methods of preparation thereof. The process includes mixing a reagent with a metal precursor to form a precursor mixture, compressing the precursor mixture into a self-standing precursor element (e.g. brick and tile), and heating the self-standing precursor element (e.g. brick and tile) to form a self-standing calcined element (e.g. brick and tile) comprising a cathode active material.

23 Claims, 7 Drawing Sheets

(51) Int. Cl.

| | |
|---|---|
| ***C01G 53/506*** | (2025.01) |
| ***H01M 4/62*** | (2006.01) |
| *H01M 4/02* | (2006.01) |

(56) References Cited

FOREIGN PATENT DOCUMENTS

| | | | |
|---|---|---|---|
| CN | 111146402 | | 5/2020 |
| EP | 0 918 041 | | 6/1999 |
| JP | 2019-172510 | | 10/2019 |
| JP | 2019-175696 | | 10/2019 |
| JP | 2019-175697 | | 10/2019 |
| JP | 2019-175698 | | 10/2019 |
| JP | 2019-175701 | | 10/2019 |
| KR | 10-2018-0074252 | | 7/2018 |
| NO | 322407 | * | 10/2006 |
| WO | WO0199214 | * | 12/2001 |
| WO | WO 2011/162195 | | 12/2011 |
| WO | WO2016201209 | * | 12/2016 |
| WO | WO2019117281 | * | 9/2019 |

* cited by examiner

SINTERED CATHODE ACTIVE MATERIAL BRICKS AND METHODS THEREOF

INCORPORATION BY REFERENCE TO ANY PRIORITY APPLICATIONS

Any and all applications for which a foreign or domestic priority claim is identified in the Application Data Sheet or Request as filed with the present application are hereby incorporated by reference under 37 CFR 1.57, and Rules 4.18 and 20.6, such as U.S. Provisional App. No. 63/081,470, filed Sep. 22, 2020.

BACKGROUND

Field

This disclosure is generally related to electrode active materials and their processes for formation. More specifically, this disclosure is related to the formation of metal oxide cathode materials for lithium ion batteries.

Description of the Related Art

Calcination of metal oxide cathode active materials typically involves baking materials in powder form through large roller hearth kilns at high-temperatures to achieve target material properties. This high temperature process begins with a mixture of a lithium compound with a metal precursor to form a powder mixture. The powder is typically carried in saggars (i.e. large ceramic crucibles), which are then fed into long high temperature kilns for a total residence time exceeding 12 hrs. An example schematic illustration of a saggar holding a cathode precursor powder is shown in FIG. 1 with a cathode powder height of approximately 80 mm and a bulk density of about 0.9 kg/m$^3$. The reacted materials are subsequently removed from the saggars, milled to a target particle size, and optionally undergo a surface treatment process before being fed to the electrode production process.

However, the calcination process occupies the highest portion on the manufacturing cost among all processes, due to the highest capital cost of the roller hearth kilns (RHK) typically used, highest energy consumption and long residence times. As a result, maximizing throughput of these kilns is critical to reducing the capital and operating cost of cathode production.

Furthermore, the saggars themselves introduce an inefficiency into the calcination process. The standard dimensions of the saggar for RHK are 100 mm×330 mm×330 mm (H×W×L), with a usable height of ≤80 mm and with a total weight in excess of 5 kg per saggar. The typical bulk density of the powder mixture is about 0.9 g/cm$^3$. Normally only about 4.5 kg of mixed material can be filled in each saggar, where higher loading may affect gas diffusion and thermal distribution causing quality issues. Although increased productivity may be achieved by stacking saggars on one another, where a common industrial kiln configuration can accommodate a row of 4 saggars in parallel stacked 2 high, such a productivity strategy is not scalable.

As such, saggars have numerous inherent inefficiencies including: 1) as a result of powders being stagnant in the crucibles, heat and mass transfer coefficients are low, further increasing required residence time in the kilns; 2) cool down times at the outlet of the kiln are typically extended to prevent saggar cracking and to extend saggar life; 3) high consumable costs, as saggars typically need to be replaced after 1-2 weeks of use; and 4) saggar handling and inspection systems are high capital intensity and can be the cause of frequent downtime.

In addition, calcination may include further processing in order to improve the crystallinity of the active material. Improved crystallinity of the active material typically correlates with improved energy storage device performance, however further processing to obtain the improved crystallinity introduces additional inefficiencies to the manufacturing process.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

In one aspect, a self-standing calcined element is described. The self-standing calcined element includes a cathode active material at an amount of at least about 95 wt. %.

In some embodiments, the cathode active material comprises crystalline cathode active material particles. In some embodiments, the cathode active material is selected from the group consisting of lithium nickel manganese cobalt oxide (NMC), lithium manganese oxide (LMO), lithium iron phosphate (LFP), lithium cobalt oxide (LCO), lithium titanate (LTO), lithium nickel manganese oxide (LNMO), lithium nickel cobalt aluminum oxide (NCA), nickel manganese aluminum oxide (NMA), nickel cobalt manganese aluminum oxide (NMCA), $LiNiO_2$, or combinations thereof. In some embodiments, the self-standing calcined element comprises at most about 1 wt. % of residual lithium. In some embodiments, the self-standing calcined element comprises about 0.1-1 wt. % of a binder. In some embodiments, the self-standing calcined element is substantially free of a binder.

In some embodiments, the self-standing calcined element comprises a plurality of through-holes. In some embodiments, the self-standing calcined element comprises 2-50 through-holes. In some embodiments, each of the plurality of through-holes are about 10-30 mm in diameter. In some embodiments, the self-standing calcined element comprises the plurality of through-holes at about 0.1-30% of a total element volume. In some embodiments, the self-standing calcined element comprises a surface pattern configured to form at least one channel between adjacent elements. In some embodiments, the self-standing calcined element is in a shape of a brick or a tile. In some embodiments, the self-standing calcined element comprises a density of about 1.9-2.3 g/cm$^3$. In some embodiments, the self-standing calcined element comprises a density of about 1.7-1.8 g/cm$^3$.

In another aspect, a process for preparing a cathode active material is described. The process includes mixing a reagent with a metal precursor to form a precursor mixture, compressing the precursor mixture into a self-standing precursor element, and heating the self-standing precursor element to form a self-standing calcined element comprising a cathode active material.

In some embodiments, the reagent is a lithium reagent. In some embodiments, the lithium reagent selected from the group consisting of lithium hydroxide, lithium hydroxide monohydrate, lithium carbonate, and combinations thereof. In some embodiments, the metal precursor is selected from the group consisting of a metal oxide, metal hydroxide, a metal carbonate, and combinations thereof. In some embodiments, the metal precursor comprises a metal selected from the group consisting of Ni, Mn, Co, Al, Mg, Fe, Ti, and combinations thereof.

In some embodiments, the precursor mixture further comprises a solvent. In some embodiments, the solvent is water. In some embodiments, the precursor mixture comprises about 0.1-20 wt. % solvent. In some embodiments, the precursor mixture further comprises a binder. In some embodiments, the binder is selected from the group consisting of poly(ethylene glycol) (PEG), poly(ethylene oxide) (PEO), polyvinylpyrrolidone (PVP), polyvinyl alcohol (PVA), polyacrylic acid (PAA), methyl cellulose (MC), carboxymethyl cellulose (CMC), CMC salts, hydroxypropyl cellulose (HPC), hydroxyethyl cellulose (HEC), and hydroxypropyl methylcellulose (HPMC), polytetrafluoroethylene (PTFE), and combinations thereof. In some embodiments, the precursor mixture comprises about 0.1-1 wt. % binder. In some embodiments, the precursor mixture comprises about 0.025-1 wt. % binder. In some embodiments, the self-standing precursor element comprises a plurality of through-holes. In some embodiments, the process further comprises stacking a plurality of the self-standing precursor element to form an element stack. In some embodiments, the element stack comprises at least one channel between adjacent self-standing precursor elements. In some embodiments, the self-standing precursor element comprises a density of about 1.9-2.3 g/cm$^3$.

In some embodiments, the self-standing precursor element is supported by a substrate while heated. In some embodiments, the self-standing precursor element is conveyed through a high-temperature tunnel kiln when heated. In some embodiments, heating is performed in an atmosphere selected from the group consisting of an oxidizing atmosphere, an inert atmosphere, and a reducing atmosphere. In some embodiments, heating is performed in an atmosphere comprising oxygen. In some embodiments, heating is performed at a temperature of about 650-850° C. In some embodiments, the process comprises pre-heating the self-standing precursor element. In some embodiments, the process does not comprise an additional heating step of the cathode active material.

In some embodiments, the process further comprises destructuring the self-standing calcined element to form a calcined element powder. In some embodiments, destructuring comprises a step selected from the group consisting of crushing, milling, and combinations thereof. In some embodiments, the process further comprises treating the cathode active material. In some embodiments, treating comprises a step selected from the group consisting of sieving, washing, filtering, drying, coating, and combinations thereof.

In another aspect, a process for forming a cathode electrode is described. The process includes incorporating the cathode active material as described herein into an electrode film, and disposing the electrode film over a current collector.

In another aspect, a process for forming an energy storage device is described. The process includes placing a separator, an anode electrode and the cathode electrode as described herein within a housing, wherein the separator is placed between the anode electrode and the cathode electrode. In some embodiments, the energy storage device is a battery.

DETAILED DESCRIPTION

Figure 1:
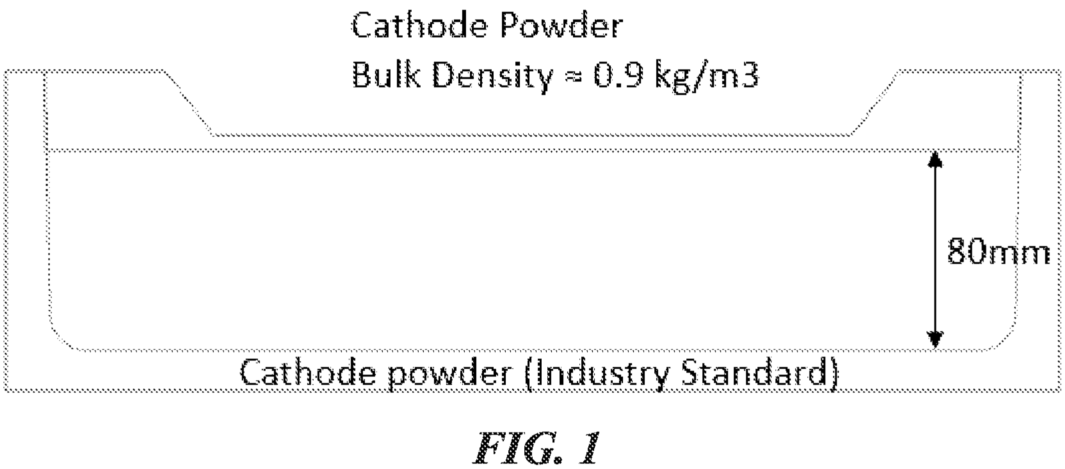
FIG. 1 PRIOR ART
FIG. 1 is a schematic of a prior art cathode precursor powder held in a saggar.

Provided herein are various embodiments of preparing cathode active materials with improved crystallinity. In certain embodiments, a self-standing precursor element (e.g. brick and tile) is formed and heated to produce a self-standing calcined element (e.g. brick and tile) comprising a cathode active material, wherein the cathode active material demonstrates improved crystallinity. For example, in some embodiments, a mixture of lithium and metal powders are formed into self-standing or self-supporting elements (e.g. bricks and tiles), which are subsequently conveyed through a high temperature furnace. In some embodiments, the elements (e.g. precursor, pre-baked and/or calcined elements) may be in any geometric shape or form that are self-standing, such as bricks and/or tiles.

The use of self-standing elements (e.g. bricks and tiles) allows for the removal of saggars from the production process, and results in numerous improvements in production such as: 1) increased volumetric efficiency of the sintering process; 2) increasing the throughput of common industrial kilns; 3) reduced thermal mass that needs to be heated and cooled each cycle; 4) increased thermal conductivity of the powder mixture being fed into the furnace; 5) increasing thermal uniformity; 6) reducing necessary process residence time; 7) reduced consumable cost by simplifying geometry of support (e.g. saggar vs. plates).

Precursor Mixture

Prior the formation of the elements, in one embodiment a precursor mixture is formed comprising a reagent and a metal precursor. In some embodiments, the reagent is a lithium reagent. In some embodiments, the lithium reagent selected from lithium hydroxide, lithium hydroxide monohydrate, lithium carbonate, and combinations thereof. In some embodiments, the metal precursor is selected from a metal oxide ($M_xO_n$), metal hydroxide ($M_x(OH)_n$), a metal carbonate ($M_x(CO_3)_n$), and combinations thereof, wherein "M" represents a metal and "x" and "n" are values which create a neutrally charged metal precursor. In some embodiments, the metal precursor comprises a metal ("M") selected from Ni, Mn, Co, Al, Mg, Fe, Ti, and combinations thereof.

In some embodiments, precursor mixture further comprises a solvent. In some embodiments the solvent may aid in preserving the shape of the elements formed from the precursor mixture through the calcination process. In some embodiments, the solvent is water. In some embodiments, the precursor mixture comprises, or comprises about, 0.1 wt. %, 0.5 wt. %, 1 wt. %, 5 wt. %, 10 wt. %, 15 wt. %, 20 wt. %, 25 wt. % or 30 wt. % of solvent, or any range of values therebetween. In some embodiments, the precursor mixture is free of or substantially free of solvent or added solvent. In some embodiments, the precursor mixture is free of or substantially free of water or added water. For example, in some embodiments a precursor mixture that is substantially free of water or added water may comprise water that is absorbed from atmospheric moisture.

In some embodiments, precursor mixture further comprises a binder. In some embodiments the binder may aid in preserving the shape of the elements formed from the precursor mixture through the calcination process. In some embodiments, the binder comprises a polymeric material. In some embodiments, the binder comprises a water-soluble polymeric material. In some embodiments, the binder comprises a polymeric material selected from poly(ethylene glycol) (PEG), poly(ethylene oxide) (PEO), polyvinylpyrrolidone (PVP), polyvinyl alcohol (PVA), polyacrylic acid (PAA), methyl cellulose (MC), carboxymethyl cellulose (CMC) and salts thereof (e.g. sodium CMC), hydroxypropyl cellulose (HPC), hydroxyethyl cellulose (HEC), and hydroxypropyl methylcellulose (HPMC), polytetrafluoroethylene (PTFE), and combinations thereof. In some embodiments, the polymeric material has a weight average molecular weight of, or of about, 20000, 25000, 28000, 30000, 40000, 50000, 60000, 70000, 80000, 90000, 100000, 110000, 1200000, 1300000, 1400000, 1600000 or 2000000, or any range of values therebetween. In some embodiments, the precursor mixture comprises, or comprises about, 0.01 wt. %, 0.02 wt. %, 0.025 wt. %, 0.3 wt. %, 0.04 wt. %, 0.05 wt. %, 0.06 wt. %, 0.07 wt. %, 0.08 wt. %, 0.09 wt. %, 0.1 wt. %, 0.2 wt. %, 0.3 wt. %, 0.4 wt. %, 0.5 wt. %, 0.6 wt. %, 0.7 wt. %, 0.8 wt. %, 1 wt. %, 1.2 wt. %, 1.5 wt. % or 2 wt. % of binder, or any range of values therebetween.

In some embodiments, precursor mixture further comprises an additive. In some embodiments, the additive comprises an element is selected from Fe, Ti, and combinations thereof.

Precursor and Calcined Elements

From the precursor mixture a precursor or raw element is formed, wherein the element is self-standing or self-supporting. In some embodiments, the self-standing precursor brick is heated in a pre-baking or pre-heating step to form a self-standing pre-baked element. Furthermore, the self-standing precursor or pre-baked element may then be heated to react the reagent and metal precursor and form a self-standing calcined element, wherein the calcined element comprises a cathode active material. The precursor element comprises the same or substantially the same composition as the precursor mixture from which it is formed. A self-standing or self-supported element is understood as an element that retains its shape and structure under its own weight.

Figure 2A:
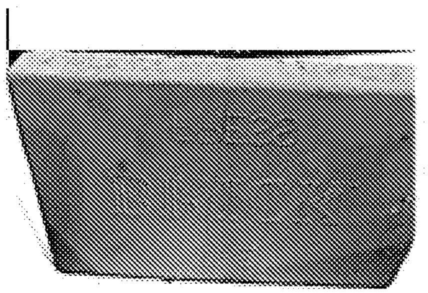
FIG. 2A shows an image of a formed dry brick according to some embodiments.
Figure 2B:
FIG. 2B shows an image of the dry brick of FIG. 2A that has fallen apart after baking according to some embodiments.
Figure 2C:
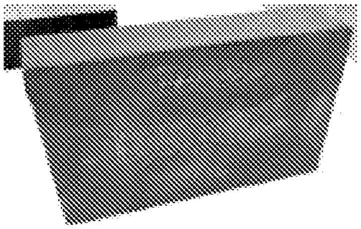
FIG. 2C shows an image of a formed self-standing brick comprising water and binder according to some embodiments.
Figure 2D:
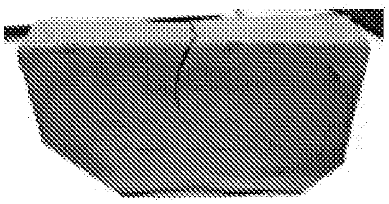
FIG. 2D shows an image of the self-standing brick of FIG. 2C after baking according to some embodiments.

FIGS. 2A and 2B are photographic images of bricks without water and binder according to some embodiments, and FIGS. 2C and 2D are images of bricks with water and binder according to some embodiments. In FIG. 2A, a dry brick formed from a mixture without water and binder is formed into a self-standing precursor brick. In this embodiment, the precursor brick was found to have a density of 1.7 g/cm$^3$. However, the dry brick of FIG. 2A did not maintain its formed brick structure and fell apart over time as shown in FIG. 2B. In contrast, FIG. 2C shows a brick comprising water and binder that was formed at a density of approximately 1.8 g/cm$^3$. This brick was found to substantially maintain its structure over time as shown in FIG. 2D. The bricks shown in FIGS. 2C and 2D may be considered self-standing as described herein.

Figure 3A:
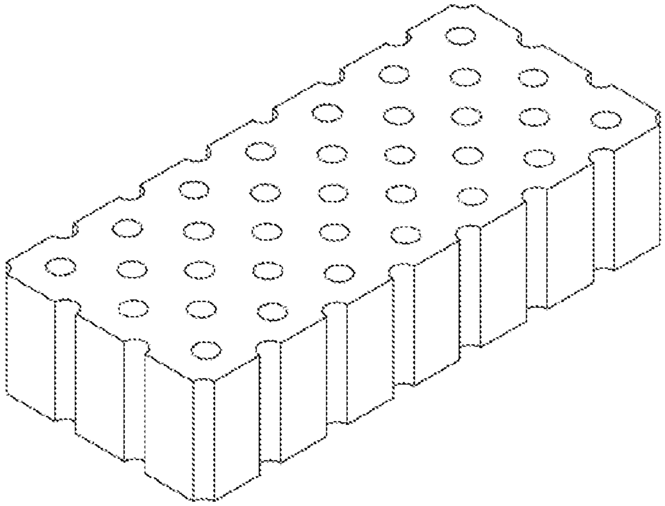
FIG. 3A is a schematic illustration of a self-standing precursor brick having a plurality of through holes according to some embodiments.
Figure 3B:
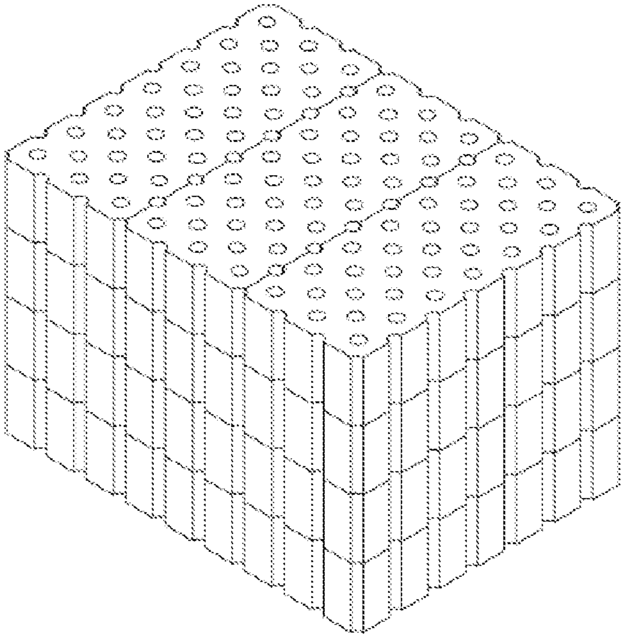
FIG. 3B is a schematic of a stack of the self-standing precursor bricks of FIG. 3A according to some embodiments.
Figure 3C:
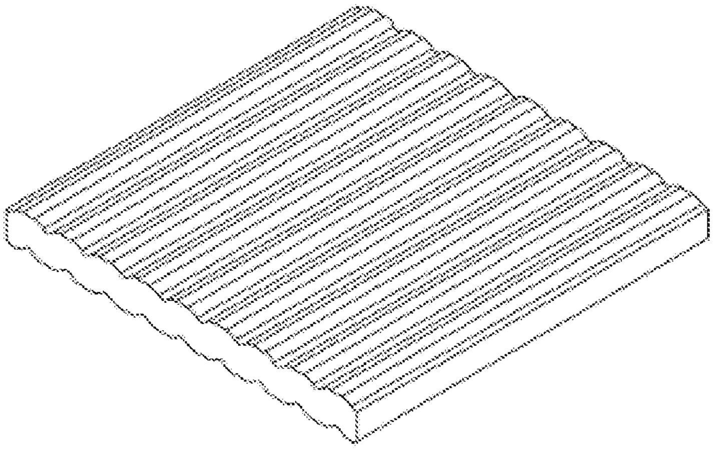
FIG. 3C is a schematic illustration of a self-standing precursor tile according to some embodiments.
Figure 3D:
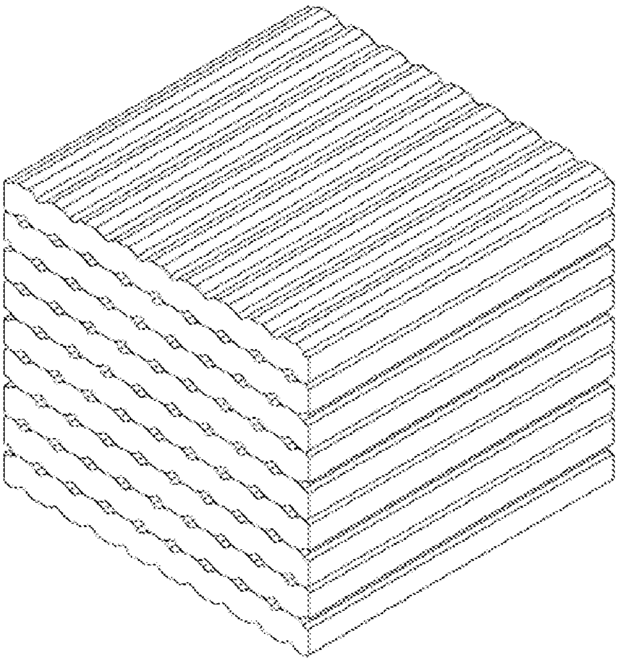
FIG. 3D is a schematic of a stack of the self-standing precursor tiles of FIG. 3C according to some embodiments.

In some embodiments, the self-standing precursor element comprises a plurality of through-holes. FIG. 3A is a schematic of a self-standing precursor brick comprising a plurality of through-holes according to some embodiments. FIG. 3B is a schematic of such self-standing precursor bricks comprising a plurality of through-holes as stacked, one on top of the other. In some embodiments, the self-standing precursor element comprises a surface pattern such that when the elements are stacked at least one channel is formed between adjacent elements.

FIG. 4A is a schematic of a self-standing precursor tile with a wave surface pattern, according to some embodiments. FIG. 4B is a schematic of such self-standing precursor tiles with wave surface patterns such that when the tiles are stacked a plurality of channels are formed between adjacent stacked tiles.

Precursor elements (or in any form, such as precursor, pre-baked, calcined or during any other step in the processes disclosed) may include at least one through-hole and/or a surface pattern that enables the formation of at least one channel when stacked. Such through-holes and/or channels between the stacked bricks or tiles may aid in atmosphere (e.g. an oxidizing atmosphere (for example comprising oxygen), an inert atmosphere, or a reducing atmosphere) diffusion into, and moisture release from, the elements. For example, oxygen diffusion into the precursor elements may aid oxygen consumption as part of the reaction that forms the cathode active material, wherein through-holes and/or channels may allow $O_2$ to access the reagents within and/or at the center of the element while allowing the remainder of the element to maintain a high packing density. Furthermore, as $H_2O$ is generated as part of the reaction forming the cathode active material, the through-holes and/or channels may allow for moisture to escape from within and/or at the center of the element thereby effecting the final material properties of the element after heating. For example, in some embodiments the through-holes and/or channels may prevent cracking of the element after baking.

In some embodiments, the self-standing precursor element comprises, or comprises about, 2, 4, 6, 8, 10, 12, 15, 20, 25, 30 or 50 through-holes, or any range of values therebetween. In some embodiments, each of the plurality of through-holes are, or are about, 1 mm, 5 mm, 10 mm, 15 mm, 20 mm, 25 mm, 30 mm, 40 mm, 50 mm, 75 mm or 100 mm in diameter, or any range of values therebetween. In some embodiments, each of the plurality of through-holes are spaced from other through-holes by, or by about, 10 mm, 11 mm, 12 mm, 13 mm, 14 mm, 15 mm, 17 mm, 20 mm, 25 mm, 30 mm, 35 mm, 40 mm, 45 mm, 50 mm, 60 mm, 65 mm, 70 mm, 75 mm, 80 mm, 85 mm, 90 mm, 95 mm, 100 mm, 120 mm, 150 mm or 200 mm, or any range of values therebetween. In some embodiments, the through-holes are, or are substantially, homogenously distributed through the element on at least one surface of the element. In some embodiments, the element comprises through-holes at, at about, in at least, or in at least about, 0.1%, 0.5%, 1%, 1.5%, 2%, 2.5% 3%, 4%, 5%, 6%, 8%, 10%, 15%, 20%, 25%, 30% or 40% of the total element volume, or any range of values therebetween. In some embodiments, the self-standing element does not comprise through-holes.

In some embodiments, a pair of adjacent self-standing precursor elements comprise, or comprise about, 1, 2, 3, 4, 5, 6, 7, 8, 9, 10, 11, 12, 13, 14, 15, 16, 17, 18, 19, 20, 25, 30 or 50 channels, or any range of values therebetween. In some embodiments, each of the plurality of channels are, or are about, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 17 mm, 20 mm, 25 mm, 30 mm, 35 mm, 40 mm, 45 mm, 50 mm, 60 mm, 70 mm, 75 mm or 100 mm in a characteristic dimension (e.g. length, width, diameter) when viewed from the exterior side of the element stack, or any range of values therebetween. In some embodiments, each of the plurality of channels are spaced from another channel by, or by about, 10 mm, 11 mm, 12 mm, 13 mm, 14 mm, 15 mm, 17 mm, 20 mm, 25 mm, 30 mm, 35 mm, 40 mm, 45 mm, 50 mm, 60 mm, 65 mm, 70 mm, 75 mm, 80 mm, 85 mm, 90 mm, 95 mm, 100 mm, 120 mm, 150 mm or 200 mm, or any range of values therebetween. In some embodiments, at least one of the plurality of channels extend the length of the pair of the adjacent self-standing elements. In some embodiments, each of the plurality of channels extend the length of the pair of the adjacent self-standing elements. In some embodiments, the self-standing precursor element does not comprise through-holes.

In some embodiments, the self-standing precursor element has a thickness of, of about, of at most, or of at most about, 0.5 mm, 1 mm, 2 mm, 3 mm, 4 mm, 5 mm, 6 mm, 8 mm, 10 mm, 20 mm, 40 mm, 60 mm or 100 mm, or any range of values therebetween.

In some embodiments, the self-standing precursor element comprises a density of, or of about, 1 g/cm$^3$, 1.2 g/cm$^3$, 1.3 g/cm$^3$, 1.4 g/cm$^3$, 1.5 g/cm$^3$, 1.6 g/cm$^3$, 1.7 g/cm$^3$, 1.8 g/cm$^3$, 1.9 g/cm$^3$, 2 g/cm$^3$, 2.2 g/cm$^3$, 2.3 g/cm$^3$, 2.4 g/cm$^3$, 2.6 g/cm$^3$, 2.8 g/cm$^3$, 3 g/cm$^3$, 3.5 g/cm$^3$, 4 g/cm$^3$, 4.5 g/cm$^3$ or 5 g/cm$^3$, or any range of values therebetween. In some embodiments, the density of the element is the density of the material of the element excluding the through-holes.

In some embodiments, the self-standing calcined element comprises, comprises about, comprises at least, or comprises at least about, 90 wt. %, 91 wt. %, 92 wt. %, 93 wt. %, 94 wt. %, 95 wt. %, 96 wt. %, 97 wt. %, 98 wt. %, 99 wt. %, 99.2 wt. %, 99.5 wt. %, 99.8 wt. %, 99.9 wt. % or 100 wt. % of cathode active material, or any range of values therebetween. In some embodiments, the cathode active material comprises crystalline cathode active material particles. In some embodiments, the self-standing calcined element comprises, comprises about, comprises at least, or comprises at least about, 50 wt. %, 60 wt. %, 70 wt. %, 80 wt. %, 90 wt. %, 95 wt. %, 98 wt. %, 99 wt. % or 100 wt. % of the crystalline cathode active material particles, or any range of values therebetween. In some embodiments, the cathode active material is selected from lithium nickel manganese cobalt oxide (NMC), lithium manganese oxide (LMO), lithium iron phosphate (LFP), lithium cobalt oxide (LCO), lithium titanate (LTO), lithium nickel manganese oxide (LNMO), lithium nickel cobalt aluminum oxide (NCA), nickel manganese aluminum oxide (NMA), nickel cobalt manganese aluminum oxide (NMCA), $LiNiO_2$, or combinations thereof.

In some embodiments, the self-standing calcined element comprises, comprises about, comprises at most, or comprises at most about, 5 wt. %, 4 wt. %, 3 wt. %, 2 wt. %, 1 wt. %, 0.5 wt. % or 0.1 wt. % of lithium reagent, or any range of values therebetween. In some embodiments, the self-standing calcined element comprises, comprises about, comprises at most, or comprises at most about, 5 wt. %, 4 wt. %, 3 wt. %, 2 wt. %, 1 wt. %, 0.5 wt. % or 0.1 wt. % of metal precursor, or any range of values therebetween. In some embodiments, the self-standing calcined element is free of, or substantially free of, water. In some embodiments, the self-standing calcined element comprises, comprises about, comprises at most, or comprises at most about, 1 wt. %, 0.5 wt. %, 0.1 wt. % or 0.01 wt. %, of water, or any range of values therebetween. In some embodiments, the self-standing calcined element comprises, comprises about, comprises at most, or comprises at most about, 0.01 wt. %, 0.05 wt. %, 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.2 wt. %, 1.5 wt. % or 2 wt. %, of binder, or any range of values therebetween. In some embodiments, the self-standing calcined element is free, or is substantially free, of binder. In some embodiments, the self-standing calcined element comprises degraded binder residue. In some embodiments, the self-standing calcined element is, or is substantially free of, a degraded binder residue. In some embodiments, the self-standing calcined element comprises, comprises about, comprises at most, or comprises at most about, 10 wt. %, 9 wt. %, 8 wt. %, 7 wt. %, 6 wt. %, 5 wt. %, 4 wt. %, 3 wt. %, 2 wt. %, 1 wt. %, 0.5 wt. % or 0.1 wt. % of residual lithium, or any range of values therebetween.

In some embodiments, the self-standing calcined element comprises a plurality of through-holes. In some embodiments, the self-standing calcined element comprises a surface pattern such that when the elements are stacked at least one channel is formed between adjacent elements. In some embodiments, the plurality of through-holes and or channels of the self-standing calcined element are retained or substantially retained from the self-standing precursor element. In some embodiments, the self-standing calcined element comprises, or comprises about, 2, 4, 6, 8, 10, 12, 15, 20, 25, 30 or 50 through-holes, or any range of values therebetween. In some embodiments, each of the plurality of through-holes are, or are about, 1 mm, 5 mm, 10 mm, 15 mm, 20 mm, 25 mm, 30 mm, 40 mm, 50 mm, 75 mm or 100 mm in diameter, or any range of values therebetween. In some embodiments, each of the plurality of through-holes are spaced from other through-holes by, or by about, 10 mm, 11 mm, 12 mm, 13 mm, 14 mm, 15 mm, 17 mm, 20 mm, 25 mm, 30 mm, 35 mm, 40 mm, 45 mm, 50 mm, 60 mm, 65 mm, 70 mm, 75 mm, 80 mm, 85 mm, 90 mm, 95 mm, 100 mm, 120 mm, 150 mm or 200 mm, or any range of values therebetween. In some embodiments, the through-holes are, or are substantially, homogenously distributed through the element on at least one surface of the element. In some embodiments, the element comprises through-holes at, at about, in at least, or in at least about, 0.1%, 0.5%, 1%, 1.5%, 2%, 2.5% 3%, 4%, 5%, 6%, 8%, 10%, 15%, 20%, 25% or 30% of the total element volume, or any range of values therebetween. In some embodiments, the self-standing calcined element does not comprise through-holes.

In some embodiments, a pair of adjacent self-standing calcined elements comprises, or comprises about, 1, 2, 3, 4, 5, 6, 7, 8, 9, 10, 11, 12, 13, 14, 15, 16, 17, 18, 19, 20, 25, 30 or 50 channels, or any range of values therebetween. In some embodiments, each of the plurality of channels are, or are about, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 17 mm, 20 mm, 25 mm, 30 mm, 35 mm, 40 mm, 45 mm, 50 mm, 60 mm, 70 mm, 75 mm or 100 mm in a characteristic dimension (e.g. length, width, diameter) when viewed from the exterior side of the element stack, or any range of values therebetween. In some embodiments, each of the plurality of channels are spaced from another channel by, or by about, 10 mm, 11 mm, 12 mm, 13 mm, 14 mm, 15 mm, 17 mm, 20 mm, 25 mm, 30 mm, 35 mm, 40 mm, 45 mm, 50 mm, 60 mm, 65 mm, 70 mm, 75 mm, 80 mm, 85 mm, 90 mm, 95 mm, 100 mm, 120 mm, 150 mm or 200 mm, or any range of values therebetween. In some embodiments, at least one of the plurality of channels extend the length of the pair of the adjacent self-standing elements. In some embodiments, each of the plurality of channels extend the length of the pair of the adjacent self-standing elements. In some embodiments, the self-standing precursor element does not comprise through-holes.

In some embodiments, the self-standing calcined element has a thickness of, of about, of at most, or of at most about, 0.5 mm, 1 mm, 2 mm, 3 mm, 4 mm, 5 mm, 6 mm, 8 mm, 10 mm, 20 mm, 40 mm, 60 mm or 100 mm, or any range of values therebetween.

In some embodiments, the self-standing calcined element comprises a density of, or of about, 0.8 g/cm$^3$, 0.9 g/cm$^3$, 1 g/cm$^3$, 1.2 g/cm$^3$, 1.3 g/cm$^3$, 1.4 g/cm$^3$, 1.5 g/cm$^3$, 1.6 g/cm$^3$, 1.7 g/cm$^3$, 1.75 g/cm$^3$, 1.8 g/cm$^3$, 1.9 g/cm$^3$, 2 g/cm$^3$, 2.2 g/cm$^3$, 2.3 g/cm$^3$, 2.4 g/cm$^3$, 2.6 g/cm$^3$, 2.8 g/cm$^3$, 3 g/cm$^3$, 3.5 g/cm$^3$, 4 g/cm$^3$, 4.5 g/cm$^3$, 5 g/cm$^3$, 5.5 g/cm$^3$ or 6 g/cm$^3$, or any range of values therebetween. In some embodiments, the self-standing calcined element does not comprise, or does not substantially comprise, cracks.

In some embodiments, the self-standing precursor element may be heated prior to form a free-standing pre-baked element, and subsequently heated to form the self-standing calcined element. Pre-heating of the element may aid in the dehydration of free water, the decomposition of $LiOH \cdot H_2O$ into LiOH, and/or the decomposition of metal hydroxide precursors (e.g. $Ni_{0.83}Mn_{0.06}Co_{0.11}(OH)_2$) into metal oxide precursors (e.g. $Ni_{0.83}Mn_{0.06}Co_{0.11}O$) if the precursor is not pre-oxidized. In some embodiments, the free-standing pre-baked element may comprise through-holes and surface patterns that enable at least one channel when stacked as described with regard to precursor and/or calcined elements. In some embodiments, the free-standing pre-baked element may comprise other characteristics (e.g. dimensions, densities and/or chemical compositions) similar to or the same as those described with regard to precursor and/or calcined elements.

Element and Cathode Active Material Formation Process

Figure 4:
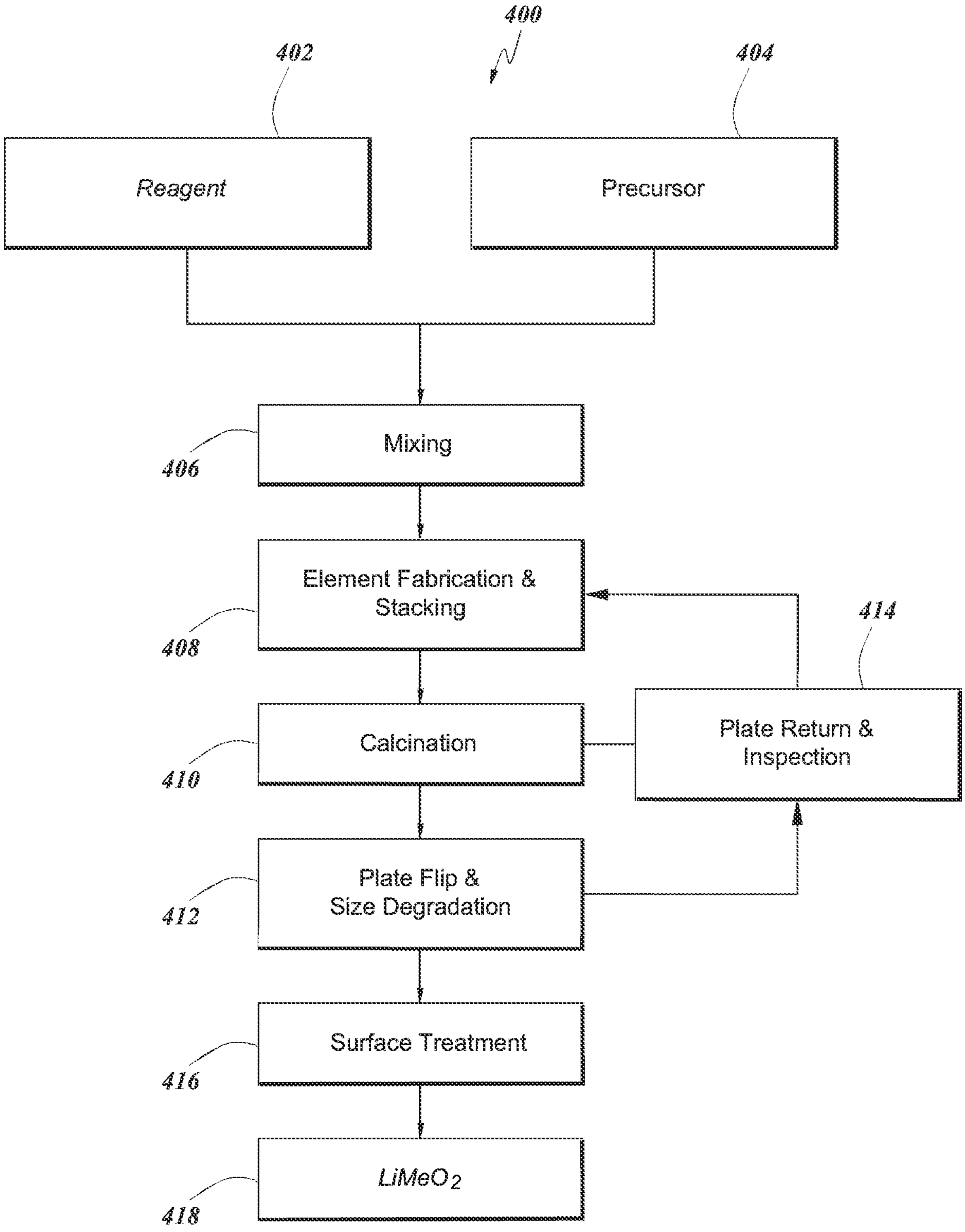
FIG. 4 is a flow chart depicting a process of forming a cathode material through a formation process according to some embodiments.

FIG. 4 is a 400 flow chart depicting an example of the formation of a cathode material through a formation process according to some embodiments. A reagent 402 and a precursor 404 are provided and mixed 406 to form a mixture. Examples of reagent 402 include $LiCO_3$, LiOH and $LiOH \cdot H_2O$, and examples of the precursor include a metal oxide ($MO_n$), a metal hydroxide ($M(OH)_n$), and a metal carbonate ($M(CO_3)_n$). After the mixture is formed in mixing step 406 the mixture is used to form precursor elements loaded onto a plate or substrate in element fabrication and stacking step 408. The elements are then heated in calcination step 410 to form calcined elements. The calcined elements are removed from the substrates and destructured to form a calcined element powder in plate flip and size degradation step 412, wherein the substrates are inspected and returned in plate return and inspection step 414 to element fabrication and stacking step 408. The calcined element powder is surface treated in surface treatment step 416 to form the cathode active material $LiMeO_2$ 418.

In some embodiments, the process includes mixing a reagent with a metal precursor to form a precursor mixture. In some embodiments, the process includes compressing the precursor mixture into a precursor element. In some embodiments, the process includes heating the precursor element to form a calcined element comprising a cathode active material. In some embodiments, the precursor element and/or the calcined element are self-standing elements.

In some embodiments, the process includes modifying the precursor element to include through-holes. In some embodiments, the precursor element is supported by a substrate while heated.

In some embodiments, the precursor element is conveyed through a tunnel kiln (e.g. low-temperature and/or high-temperature tunnel kiln). In some embodiments, the precursor or pre-baked element is heated in a high-temperature tunnel kiln. In some embodiments, the low-temperature and high-temperature kilns are the same kiln set to different temperatures. In some embodiments, the low-temperature and high-temperature kilns are different kilns. In some embodiments, heating is performed in a oxidizing atmosphere (e.g. an atmosphere comprising oxygen, such as air or an oxygen rich atmosphere (i.e. greater than 21 vol %, greater than 23.5 vol % or greater than 25 vol % oxygen)), an inert atmosphere (e.g. an atmosphere comprising helium, neon, argon, krypton, xenon, radon, and/or nitrogen), or a reducing atmosphere (e.g. an atmosphere comprising hydrogen, carbon monoxide, and/or hydrogen sulfide). For example, in some embodiments the formation of lithium iron phosphate (LFP) is performed by heating (e.g. calcination) in an inert atmosphere or reducing atmosphere. In some embodiments, a gas is passed through the through-holes and/or channels during the pre-bake and/or calcination heating of the element. In some embodiments the gas comprises an oxidizing gas (e.g. comprising oxygen, such as air or an oxygen rich atmosphere), an inert gas, or an reducing gas. In some embodiments, heating is performed at a temperature of, of about, of at least, or at least about, 700° C., 725° C., 750° C., 760° C., 780° C., 800° C., 820° C., 840° C., 850° C., 860° C., 880° C., 900° C., 950° C. or 1000° C., or any range of values therebetween. In some embodiments, the process includes pre-heating the self-standing precursor element.

In some embodiments, the precursor element is heated in a low-temperature tunnel kiln during a pre-baking or pre-heating step to form a pre-baked element (e.g. brick and tile). In some embodiments, the pre-baking step is performed prior to the calcination heating of the element. In some embodiments, calcination heating of the element further comprises the pre-baking step. In some embodiments, pre-heating is performed at a temperature below the calcination heating temperature. In some embodiments, pre-heating is performed at a temperature of, of about, of at least, or at least about, 80° C., 100° C., 120° C., 140° C., 160° C., 180° C., 200° C., 220° C., 230° C., 240° C., 250° C., 260° C., 280° C., 300° C., 320° C., 350° C., 400° C., 450° C., 500° C., 550° C., 600° C., 650° C., 700° C. or 750° C., or any range of values therebetween. In some embodiments, the process does not include an additional heating step of the cathode active material. In some embodiments, a gas is passed through the through-holes and/or channels during the pre-bake and/or calcination heating of the element. In some embodiments the gas comprises oxygen (e.g. air). In some embodiments, the self-standing pre-baked and/or calcined element does not comprise, or does not substantially comprise, cracks. In some embodiments, heating (e.g. pre-baking and/or calcination) degrades (e.g. burns and/or carbonizes) the binder in the precursor element and/or pre-baked element. In some embodiments, the degraded binder residue is vaporized from the pre-baked element and/or calcined element. In some embodiments, at least some of the degraded binder residue (e.g. a measurable amount) remains in the pre-baked element and/or calcined element. In some embodiments, the pre-baked element and/or calcined element is, or is substantially, free of the degraded binder residue. In some embodiments, heating decreases the density of the element.

In some embodiments, the process includes destructuring the self-standing calcined element to form a calcined element powder. In some embodiments, destructuring comprises a step selected from crushing, milling, and combinations thereof. In some embodiments, the process includes treating the cathode active material. In some embodiments, treating comprises a step selected from sieving, washing, filtering, drying, coating, and combinations thereof. In some embodiments, coating comprises coating the cathode active material with a coating compound selected from $TiO_2$, $Al_2O_3$, and combinations thereof. In some embodiments, coating is performed by a method selected from spray coating, mechanical fusion, and combinations thereof.

Figure 5A:
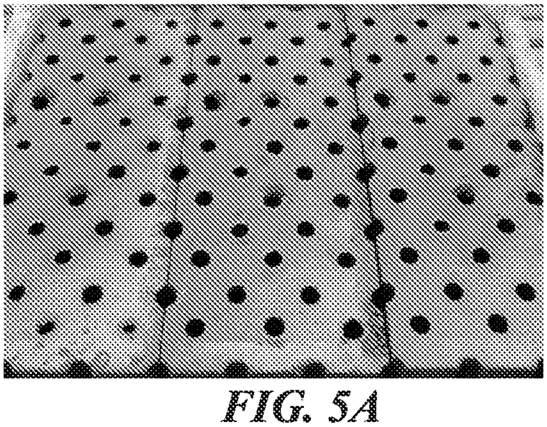
FIG. 5A shows an image of precursor bricks that have been press formed according to some embodiments.
Figure 5B:
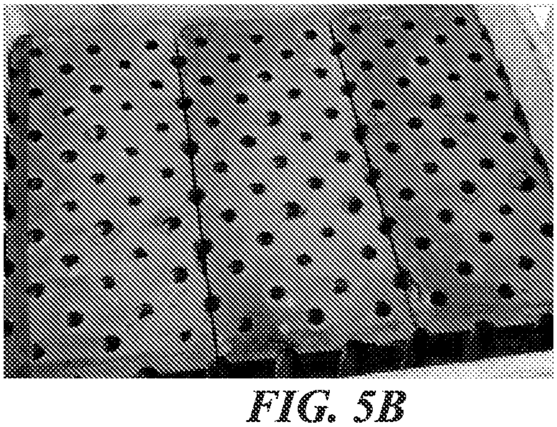
FIG. 5B shows an image of pre-baked bricks according to some embodiments.
Figure 5C:
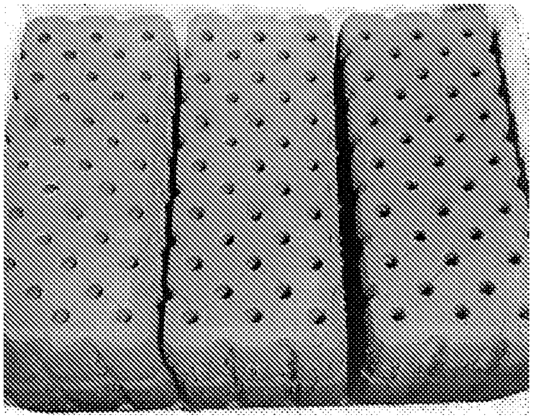
FIG. 5C shows an image of calcinated bricks that have retained their form through the calcination process, according to some embodiments.
Figure 5D:
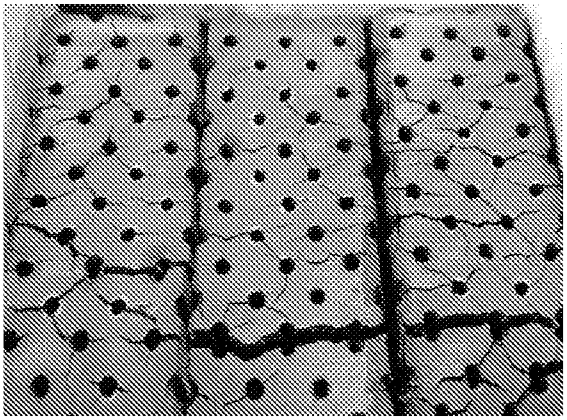
FIG. 5D shows an image of calcinated bricks that have not retained their form through the calcination process, according to some embodiments.
Figure 6A:
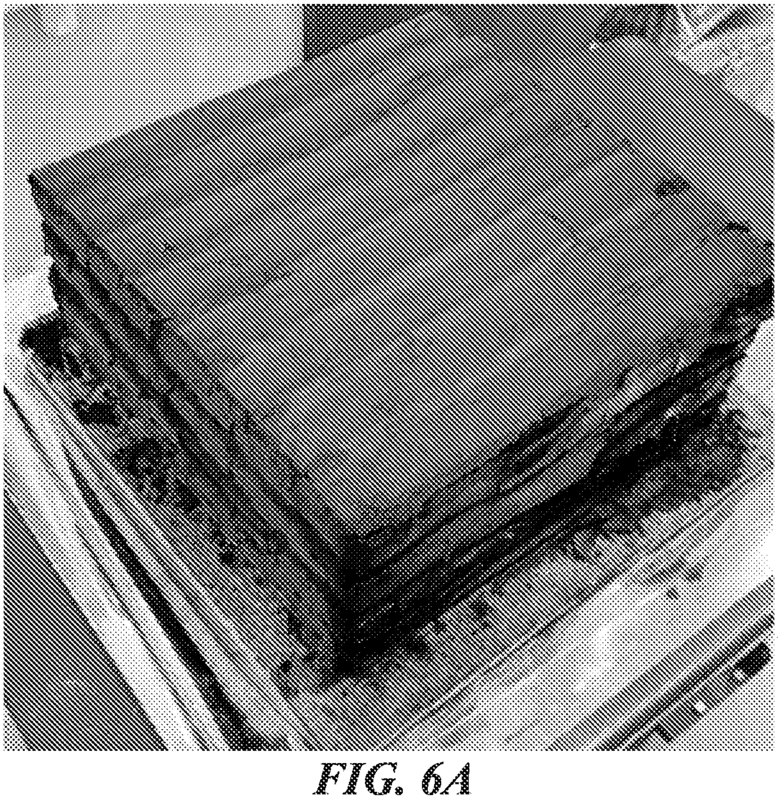
FIG. 6A shows an image of calcinated tiles that have retained their form through the calcination process, according to some embodiments.
Figure 6B:
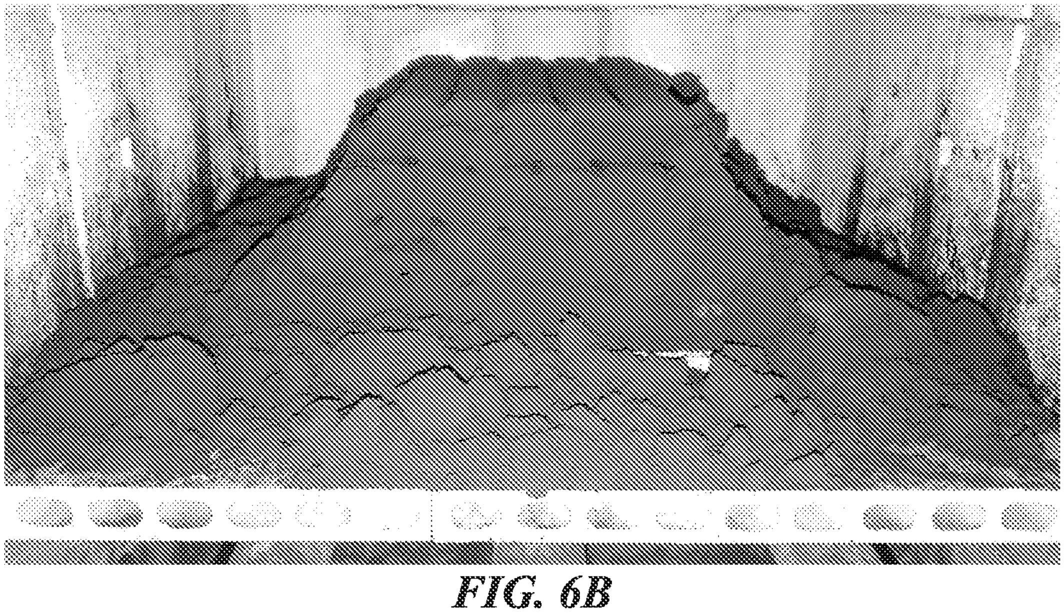
FIG. 6B shows an image of calcinated tiles that have not retained their form through the calcination process, according to some embodiments.

FIGS. 5A-5D show images of various bricks with through-holes in various stages of the formation process according to some embodiments. FIG. 5A shows precursor bricks that have been press formed, FIG. 5B shows pre-baked bricks. FIG. 5C shows calcinated bricks that have retained their form through the calcination process, while FIG. 5D shows calcinated bricks that have not retained their form through the calcination process and are seen with cracks and tears. FIGS. 6A and 6B respectively show images of stacked calcinated tiles that have retained their form through the calcination process, and have not retained their form through the calcination process.

Energy Storage Device

Once the cathode active material is isolated it may be use to prepare an electrode for an energy storage device. In some embodiments, an electrode film comprises the cathode active material described herein. In some embodiments, the cathode active material is incorporated into an electrode film. In some embodiments, the electrode film further comprises a binder. In some embodiments, an electrode comprises a current collector and the electrode film described herein. In some embodiments, the electrode film is disposed over a current collector to form a cathode electrode.

In some embodiments, an energy storage device utilizes the cathode active material described herein. In some embodiments, the energy storage device comprises a separator, an anode electrode, the cathode electrode described herein, and a housing, wherein the separator, anode electrode and cathode electrode are disposed within the housing and the separator is positioned between the anode and cathode electrodes. In some embodiments, an energy storage device is formed by placing a separator, an anode electrode and the cathode electrode described herein within a housing, wherein the separator is placed between the anode electrode and the cathode electrode. In some embodiments the energy storage device is a battery. In some embodiments the energy storage device is a lithium ion battery.

EXAMPLES

Example embodiments of the present disclosure, including processes, materials and/or resultant products, are described in the following examples.

Example 1

Micron-sized powders of lithium carbonate and electrolytic manganese dioxide (EMD) were mixed at a molar ratio of Li/Mn=1.05, then compressed into self-standing raw bricks having a density of 1.8 g/cm$^3$ in dimensions of 100 mm (H)*150 mm (W)*300 mm (L). The raw bricks were then stacked onto ceramic plates, and sent into the kiln for calcination at 850° C. for 18 hours in air. After cooling, the self-standing calcined bricks were crushed and milled into powders, and then subsequently sieved at 400 mesh to obtain the final product of spinel $LiMn_2O_4$ (LMO) as cathode material for lithium ion batteries.

Example 2

$Ni_{0.5}Mn_{0.3}Co_{0.3}(OH)_2$ sphere powders were pre-baked at 500° C. for 2 hours to obtain $Ni_{0.5}Mn_{0.3}Co_{0.3}O$ (dehydrated precursor), then mixed with lithium carbonate at a molar ratio of Li/Mn=1.08. In order to increase the integrity of the bricks, 15 wt % water was added into the mixture at the end of the mixing step. Then the mixture were compressed into self-standing raw bricks having a density of 2.5 g/cm$^3$ in dimensions of 100 mm (H)*150 mm (W)*300 mm (L). The raw bricks were then stacked onto ceramic plates, and sent into the kiln for calcination at 880° C. for 12 hours in flowing air. After cooling, the self-standing calcined bricks were crushed and milled into powders, and then sieved at 400 mesh to obtain the final product of layered NMC532 cathode material for lithium ion batteries.

Example 3

Lithium carbonate and $Ni_{0.6}Mn_{0.2}Co_{0.2}CO_3$ were mixed together at a molar ratio of Li/Mn=1.06. At the end of the mixing step, 2 wt % water was added into the mixture. The mixture was then compressed into self-standing raw bricks having a density of 2.2 g/cm$^3$ in dimensions of 300 mm (L)*50 mm (W)*150 mm (H). The raw bricks were then stacked onto ceramic plates, and sent into the kiln for calcination at 850° C. for 12 hours in flowing dry air. After cooling, the self-standing calcined bricks were crushed and milled into powders, and then sieved at 400 mesh to obtain the final product of layered NMC622 cathode material for lithium ion batteries.

Example 4

Lithium hydroxide monohydrate and $Ni_{0.6}Mn_{0.6}Co_{0.2}(OH)_2$ were mixed together at a molar ratio of Li/Mn=1.06, and 4 wt % of aqueous liquid solution was added into the mixture at the end of the mixing step, wherein the liquid solution comprises 5 wt % polyvinyl alcohol (PAV). The mixture was then compressed into self-standing raw bricks having a density of 2.0 $g/cm^3$ in dimensions of 100 mm (H)*150 mm (W)*300 mm (L), while 12 cylindrical thorough holes (diameter=20 mm) were homogeneously distributed inside the brick along the direction of length. The raw bricks were then stacked onto ceramic plates, and sent into the kiln for calcination at 850° C. for 12 hours in flowing dry air. After cooling, the self-standing calcined bricks were crushed and milled into powders, and then sieved at 400 mesh to obtain the final product of layered NMC622 cathode material for lithium ion batteries.

Example 5

Lithium hydroxide monohydrate and $Ni_{0.8}Mn_{0.1}Co_{0.1}(OH)_2$ were mixed together at a molar ratio of Li/Mn=1.02, and 4 wt % of aqeuous liquid solution are added into the mixture by the end of the mixing step, wherein the liquid solution contains 2 wt % sodium carboxymethyl cellulose (CMC). The mixture was then compressed into self-standing raw bricks of 2.5 g/cm3 in dimensions of 100 mm (H)*150 mm (W)*300 mm (L), while 12 square thorough holes (side length=20 mm) were homogeneously distributed inside the brick along the direction of length. The raw bricks were then stacked onto ceramic plates, and sent into the kiln for calcination at 780° C. for 12 hours in flowing oxygen. After cooling, the self-standing calcined bricks were crushed and milled into powders, then sieved at 400 mesh, and then subjected to surface treatment processes, including washing, filtering, drying, and subsequently coated with 0.5 wt % nano-sized $TiO_2$ through a mechanical fusion machine.

Example 6

Lithium hydroxide and $Ni_{0.8}Co_{0.1}Al_{0.1}(OH)_2$ were mixed together at a molar ratio of Li/Mn=1.02. The powders were then compressed into self standing raw bricks of 1.8 $g/cm^3$ in dimensions of 100 mm (H)*150 mm (W)*300 mm (L). The raw bricks were then stacked onto ceramic plates, and sent into the kiln for calcination at 760° C. for 12 hours in flowing oxygen. After cooling, the bricks were crushed and milled into powders, and then sieved at 400 mesh, and then subjected to surface treatment processes, including washing, filtering, drying, and subsequently coated with 0.3 wt % nano-sized $Al_2O_3$ through a mechanical fusion machine.

Example 7

A mixture of $LiOH{\cdot}H_2O$, $Ni_{0.83}Mn_{0.06}Co_{0.11}(OH)_2$, sodium carboxy methyl cellulose (CMC) as binder additive, and water was prepared and compressed into a tile. The molar ratio of $LiOH{\cdot}H_2O$ to $Ni_{0.83}Mn_{0.06}Co_{0.11}(OH)_2$ was 1.055; the weight of CMC additive was 0.25% of the total weight of $LiOH{\cdot}H_2O$ and $Ni_{0.83}Mn_{0.06}Co_{0.11}(OH)_2$; and the weight of water was 7.0% of the total weight of $LiOH{\cdot}H_2O$ and $Ni_{0.83}Mn_{0.06}Co_{0.11}(OH)_2$.

To prepare the tile, a mixture of $LiOH{\cdot}H_2O$, $Ni_{0.83}Mn_{0.06}Co_{0.11}(OH)_2$ and CMC was dry mixed, and then water was added in during mixing. The wet mixture was filled into a mold, and then pressed into a tile with a designed geometry. The thickness of the tile as pressed was between 10-50 mm, and the bulk density was 2.20 $g/cm^3$.

Such a precursor tile was free-standing, and six precursor tiles were stacked together and sent into a kiln with flowing hot air of 250° C. for pre-baking. After the pre-baking, the free-standing pre-baked tiles were sent into a roller hearth kiln (RHK) in a controlled atmosphere for calcination. The free-standing calcinated tiles were then crushed, milled, filtered, washed and dried, with the active material isolated.

Such a mixture was demonstrated to achieve a free-standing precursor tile that remains free-standing when stacked, pre-baked and calcinated.

Comparative Example

A mixture of $LiOH{\cdot}H_2O$, $Ni_{0.83}Mn_{0.06}Co_{0.11}(OH)_2$, sodium carboxy methyl cellulose (CMC) as binder additive, and water was prepared and compressed into a tile. The molar ratio of $LiOH{\cdot}H_2O$ to $Ni_{0.83}Mn_{0.06}Co_{0.11}(OH)_2$ was 1.030; the weight of CMC additive was 0.05% of the total weight of $LiOH{\cdot}H_2O$ and $Ni_{0.83}Mn_{0.06}Co_{0.11}(OH)_2$; and the weight of water was 3.0% of the total weight of $LiOH{\cdot}H_2O$ and $Ni_{0.83}Mn_{0.06}Co_{0.11}(OH)_2$.

To prepare the tile, a mixture of $LiOH{\cdot}H_2O$, $Ni_{0.83}Mn_{0.6}Co_{0.11}(OH)_2$ and CMC were dry mixed, and then water was added in during mixing. The wet mixture was filled into a mold, and then pressed into a tile with a designed geometry. The thickness of the tile as pressed was between 10-50 mm, and the bulk density is 1.90 $g/cm^3$.

Such a mixture was demonstrated to achieve a precursor tile that does not remains free-standing when stacked, pre-baked and calcinated.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

What is claimed is:

1. A process for preparing a cathode active material, comprising:
- mixing a reagent with a metal precursor to form a precursor mixture;
- compressing the precursor mixture into a self-standing precursor element; and
- heating the self-standing precursor element to form a self-standing calcined element comprising a cathode active material;
- wherein the self-standing calcined element comprises a surface pattern configured to form a plurality of channels between adjacent self-standing calcined elements, and
- wherein the self-standing calcined element comprises a density of about 1.7-2.3 g/cm$^3$.

2. The process of claim 1, wherein the self-standing calcined element comprises the cathode active material at an amount of at least about 95 wt. %.

3. The process of claim 1, wherein the self-standing calcined element comprises a density of about 1.7-1.8 g/cm$^3$.

4. The process of claim 1, wherein the reagent is a lithium reagent.

5. The process of claim 1, wherein the metal precursor is selected from the group consisting of a metal oxide, metal hydroxide, a metal carbonate, and combinations thereof.

6. The process of claim 1, wherein the precursor mixture further comprises a solvent.

7. The process of claim 6, wherein the solvent is water.

8. The process of claim 6, wherein the precursor mixture comprises about 0.1-20 wt. % solvent.

9. The process of claim 1, wherein the precursor mixture further comprises a binder.

10. The process of claim 9, wherein the binder is selected from the group consisting of poly(ethylene glycol) (PEG), poly(ethylene oxide) (PEO), polyvinylpyrrolidone (PVP), polyvinyl alcohol (PVA), polyacrylic acid (PAA), methyl cellulose (MC), carboxymethyl cellulose (CMC), CMC salts, hydroxypropyl cellulose (HPC), hydroxyethyl cellulose (HEC), and hydroxypropyl methylcellulose (HPMC), polytetrafluoroethylene (PTFE), and combinations thereof.

11. The process of claim 9, wherein the precursor mixture comprises about 0.025-1 wt. % binder.

12. The process of claim 1, wherein the self-standing precursor element comprises a plurality of through-holes.

13. The process of claim 1, further comprising stacking a plurality of the self-standing precursor element to form an element stack.

14. The process of claim 13, wherein the element stack comprises at least one channel between adjacent self-standing precursor elements.

15. The process of claim 1, wherein the self-standing precursor element comprises a density of about 1.9-2.3 g/cm$^3$.

16. The process of claim 1, wherein the self-standing precursor element is disposed over a substrate while heated.

17. The process of claim 1, wherein heating is performed in an atmosphere selected from the group consisting of an oxidizing atmosphere, an inert atmosphere, and a reducing atmosphere.

18. The process of claim 1, wherein heating is performed at a temperature of about 650-850° C.

19. The process of claim 1, wherein the process comprises pre-heating the self-standing precursor element.

20. The process of claim 1, wherein the process does not comprise an additional heating step of the cathode active material.

21. The process of claim 1, wherein each of the plurality of channels comprise a first opening, a second opening and an enclosed pathway disposed between the first and second openings.

22. The process of claim 1, wherein each of the plurality of channels comprises a channel width of 5-100 mm.

23. The process of claim 1, wherein each of the plurality of channels comprises a channel spacing of 10-200 mm.

* * * * *